United States Patent
Konovalov

(10) Patent No.: US 10,012,423 B2
(45) Date of Patent: Jul. 3, 2018

(54) COOLING DEVICE

(71) Applicant: YANDEX EUROPE AG, Lucerne (CH)

(72) Inventor: Alexander Alekseevich Konovalov, Volgodonsk (RU)

(73) Assignee: Yandex Europe AG, Lucerne (CH)

( * ) Notice: Subject to any disclaimer, the term of this patent is extended or adjusted under 35 U.S.C. 154(b) by 196 days.

(21) Appl. No.: 14/912,446

(22) PCT Filed: May 29, 2014

(86) PCT No.: PCT/IB2014/061825
§ 371 (c)(1),
(2) Date: Feb. 17, 2016

(87) PCT Pub. No.: WO2015/028896
PCT Pub. Date: Mar. 5, 2015

(65) Prior Publication Data
US 2016/0195320 A1    Jul. 7, 2016

(30) Foreign Application Priority Data
Aug. 30, 2013 (RU) ................ 2013140369

(51) Int. Cl.
*F25B 43/00* (2006.01)
*F28D 20/02* (2006.01)
(Continued)

(52) U.S. Cl.
CPC ........... *F25B 43/006* (2013.01); *F25D 16/00* (2013.01); *F25D 17/02* (2013.01); *F28D 15/00* (2013.01);
(Continued)

(58) Field of Classification Search
USPC ................................... 62/430, 185
See application file for complete search history.

(56) References Cited

U.S. PATENT DOCUMENTS 2,795,323 A    6/1957 Wallace
3,000,187 A    9/1961 Mussey et al.
(Continued)

FOREIGN PATENT DOCUMENTS

EP    2004487 B1    9/2011
GB    2173886 A  * 10/1986 ............ F25D 16/00
(Continued)

OTHER PUBLICATIONS

Basgall, Thermal Energy Storage Design for Emergency Cooling, B.S., Kansas State University, 2008, Thesis, Master of Science, Department of Mechanical Engineering, College of Engineering, Kansas State University, Manhattan, Kansas, 2010.
(Continued)

*Primary Examiner* — David Teitelbaum
*Assistant Examiner* — Paul Schwarzenberg
(74) *Attorney, Agent, or Firm* — BCF LLP

(57) ABSTRACT

There is disclosed a cooling system. The cooling system comprises a main cooling unit and a main chilling unit in fluid communication with a heat exchanger, the main chilling unit being configured to cool a liquid coolant for use with the heat exchanger. The cooling system further comprises a back-up cooling unit that includes a cooling reservoir including a plurality of small-sized self-contained cooling accumulators; a secondary chilling unit configured to cool the plurality of small-sized cooling accumulators, during a charging phase; a valve configured to selectively couple the cooling reservoir to the main cooling unit during a release phase so that the plurality of small-sized cooling accumulators provide a heat sink to cool the cooling fluid for the main cooling unit.

15 Claims, 2 Drawing Sheets

(51) Int. Cl.
*F25D 17/02* (2006.01)
*F28D 15/00* (2006.01)
*F25D 16/00* (2006.01)
F28D 20/00 (2006.01)
F25B 17/08 (2006.01)
F25B 41/04 (2006.01)
F25D 11/00 (2006.01)

(52) U.S. Cl.
CPC ......... *F28D 20/023* (2013.01); *F28D 20/028* (2013.01); *F25B 17/08* (2013.01); *F25B 41/04* (2013.01); *F25B 2500/06* (2013.01); *F25D 11/003* (2013.01); *F28D 2020/0021* (2013.01); *Y02E 60/145* (2013.01)

(56) References Cited

U.S. PATENT DOCUMENTS

| | | | |
|---|---|---|---|
| 4,211,208 A | 7/1980 | Lindner | |
| 4,656,836 A | 4/1987 | Gilbertson | |
| 4,757,690 A | 7/1988 | Holowczenko et al. | |
| 4,882,912 A | 11/1989 | Fossey | |
| 4,924,935 A | 5/1990 | Van Winckel | |
| 5,059,016 A | 10/1991 | Lawassani et al. | |
| 5,090,207 A | 2/1992 | Gilbertson et al. | |
| 5,246,061 A | 9/1993 | Zalite | |
| 5,247,811 A | 9/1993 | Seya et al. | |
| 5,255,526 A | 10/1993 | Fischer | |
| 5,323,843 A | 6/1994 | Olszewski et al. | |
| 5,386,709 A | 2/1995 | Aaron | |
| 5,525,250 A | 6/1996 | Hammond | |
| 5,598,716 A | 2/1997 | Tanaka et al. | |
| 5,778,683 A | 7/1998 | Drees et al. | |
| 5,894,739 A | 4/1999 | Temos | |
| 7,363,772 B2 | 4/2008 | Narayanamurthy | |
| 7,566,989 B2 | 7/2009 | Willets et al. | |
| D648,011 S | 11/2011 | Mikami | |
| 8,424,336 B2 | 4/2013 | Bean, Jr. | |
| 9,681,589 B1* | 6/2017 | Ross | H05K 7/208 |
| 2002/0033247 A1 | 3/2002 | Neuschutz et al. | |
| 2002/0189277 A1 | 12/2002 | Takao et al. | |
| 2004/0226309 A1 | 11/2004 | Broussard | |
| 2005/0224501 A1 | 10/2005 | Folkert et al. | |
| 2006/0266054 A1 | 11/2006 | Steinbach | |
| 2007/0132317 A1* | 6/2007 | Willets | H01M 8/00 307/66 |
| 2009/0120124 A1 | 5/2009 | Anderson | |
| 2010/0154438 A1 | 6/2010 | Bean | |
| 2010/0170663 A1 | 7/2010 | Bean | |
| 2010/0300650 A1 | 12/2010 | Bean | |
| 2010/0317278 A1 | 12/2010 | Novick | |
| 2011/0094452 A1 | 4/2011 | Huisinga et al. | |
| 2011/0113795 A1 | 5/2011 | Montminy et al. | |
| 2011/0146964 A1 | 6/2011 | Kang et al. | |
| 2011/0185750 A1 | 8/2011 | Oki | |
| 2011/0197612 A1 | 8/2011 | Campbell et al. | |
| 2011/0203779 A1 | 8/2011 | Dawes | |
| 2011/0207391 A1 | 8/2011 | Hamburgen et al. | |
| 2011/0232307 A1 | 9/2011 | Pickup | |
| 2011/0247348 A1 | 10/2011 | Mashiko et al. | |
| 2011/0259898 A1 | 10/2011 | Mogil et al. | |
| 2011/0271953 A1 | 11/2011 | Wortmann et al. | |
| 2011/0306288 A1 | 12/2011 | Murayama et al. | |
| 2011/0314810 A1 | 12/2011 | McBride et al. | |
| 2013/0016472 A1 | 1/2013 | Huettner et al. | |

FOREIGN PATENT DOCUMENTS

| | | |
|---|---|---|
| GB | 2327751 A | 2/1999 |
| RU | 2362956 C2 | 1/2007 |
| RU | 2444777 C2 | 3/2012 |

OTHER PUBLICATIONS

Menuet, Continuous Cooling is Required for Continuous Availability: Data Center Managers Need to Match Their Availability Expectations to the Appropriate Class of Continuous Cooling, The Uptime Institute, pp. 1-11.
TES, Overview, Ice Bank.
Bembry, Emergency Thermal Energy Storage: Cost & Energy Analysis, B.S., Kansas State University, 2008, Thesis, Master of Science, Department of Mechanical Engineering, College of Engineering, Kansas State University, Manhattan, Kansas, 2011.
Garday et al., Intel, Thermal Storage System Provides Emergency Data Center Cooling, White Paper Intel Information Technology Computer Manufacturing Thermal Management, Sep. 2007, 12 pages.
Ice balls help data centers become "green", AboutDC.ru, Aug. 14, 2012, http://www.aboutdc.ru/page/467.php.
English machine translation of Ice balls help data centers become "green" (reference 6), Google translation dated Mar. 13, 2017.
Thermal Energy Storage; Cristopia Energy Systems, A CIAT Group Company, France.
International Search Report from PCT/IB2014/061825, Copenheaver, Blaine, dated Jan. 2, 2015.
International Preliminary Report on Patentability from PCT/IB2014/061825, Zerphey, Christopher R., dated Aug. 26, 2015.
European Search Report from EP 14840502 dated Nov. 16, 2016.

\* cited by examiner

COOLING DEVICE

CROSS-REFERENCE

The present application claims convention priority to Russian Utility Model Application No. 2013140369, filed on Aug. 30, 2013, entitled "ОХЛАЖДАЮЩЕЕ УСТРОЙСТВО". This application is incorporated by reference herein in its entirety.

FIELD

The present technology relates to cooling devices in general and specifically to a cooling device for a dwelling or equipment.

BACKGROUND

There are many industries where cooling may be desirous or required. Some of these industries require precise control of cooling. Others require cooling that is un-interrupted and does not stop in case of power failure, for example. Some of these industries include but are not limited to: telecommunications, medical industry, precise manufacturing and the like. Same problems exist for companies who maintain computer equipment (such as servers or the like). As the number of equipment co-located in a given dwelling grows, the equipment heats up fast and requires continuous cooling for un-interrupted operations.

It is known in the art to use stationary or mobile air-conditioning units that allow for precise temperature control. Naturally, all of this equipment requires power supply in order to operate. There have been some attempts in the art to address the problems associated with back-up power and/or alternative cooling sources, especially for those industries where continuous cooling is a critical parameter for operational stability. For companies who operate computer equipment and/or servers, the uninterrupted cooling of computer equipment and/or servers can be a critical operational parameter to ensure uninterrupted data processing and integrity of the computing equipment and/or servers.

US patent application US2007/0132317 discloses, for example, power system that serves as a source of dedicated back-up power for a cooling system. The power system utilizes a plurality of fuel cells, which produce direct current (DC) power. A conversion device, such as an inverter, is used to convert the DC into alternating current (AC) for powering the cooling system. A transfer switch connects the AC power from the inverter to the cooling system. The position of the transfer switch determines the source of AC power for the cooling system.

US patent application 2010/0170663 teaches a backup cooling storage system, which comprises at least one cooling and storage unit configured to cool a liquid supply using a quantity of cooled material when a main chiller of the liquid supply is not operational, and at least one chilling element configured to generate the quantity of cooled material for the at least one cooling and storage unit when the main chiller of the liquid supply is operational. Additional embodiments and methods are further disclosed.

SUMMARY

It is an object of the present technology to ameliorate at least some of the inconveniences present in the prior art.

In one aspect, implementations of the present technology provide a cooling system. The cooling system comprises a main cooling unit and a main chilling unit in fluid communication with a heat exchanger, the main chilling unit being configured to cool a liquid coolant for use with the heat exchanger. The cooling system further comprises a back-up cooling unit that includes a cooling reservoir including a plurality of small-sized self-contained cooling accumulators; a secondary chilling unit configured to cool the plurality of small-sized cooling accumulators, during a charging phase; a valve configured to selectively couple the cooling reservoir to the main cooling unit during a release phase so that the plurality of small-sized cooling accumulators provide a heat sink to cool the cooling fluid for the main cooling unit.

In another aspect, implementations of the present technology provide a back-up cooling unit for the use with a main cooling unit. The back-up cooling unit comprises a cooling reservoir including a plurality of small-sized self-contained cooling accumulators; a secondary chilling unit configured to cool the plurality of small-sized cooling accumulators, during a charging phase; a valve configured to selectively couple the cooling reservoir to the main cooling unit during a release phase so that the plurality of small-sized cooling accumulators provide a heat sink to cool the cooling fluid for the main cooling unit.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
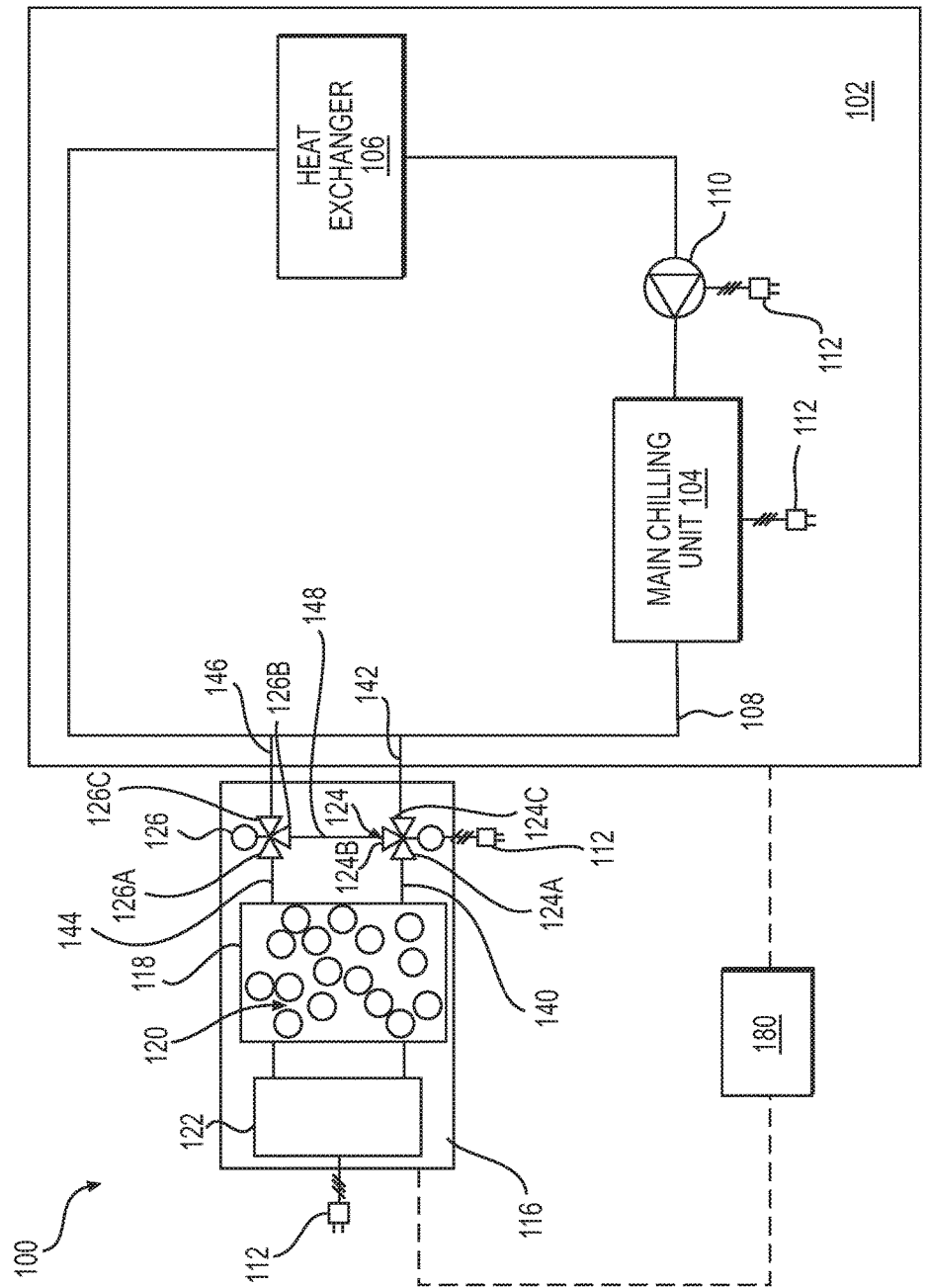
FIG. 1 depicts a schematic diagram of a cooling system 100, the cooling system 100 being implemented in accordance with non-limiting embodiments of the present technology.

With reference to FIG. 1, there is depicted a cooling system 100, the cooling system 100 being implemented in accordance with non-limiting embodiments of the present technology. It should be noted that where the cooling system 100 can be used is not at all limited. For example, the cooling system 100 can be used by a service provider (not depicted), the service provider operating a number of servers or other computing devices. Within those embodiments, the cooling system 100 may be used to cool a room (or multiple rooms) where the servers or other computing devices are located. In other embodiments of the present technology, the cooling system may be used by a hospital to cool patient rooms or room(s) storing equipment and/other computing devices.

In the above examples, it is possible to say that the cooling system 100 is implemented as a stationary cooling system, in a sense that it is not movable and is more or less located in a single geographical location. It is also possible to implement the cooling system 100 as a mobile cooling station, for example, the cooling system 100 can be used to cool goods in transit. There are numerous examples of goods that need to be transported from one geographical location to another geographical location, while requiring constant cooling—such as perishable food items or medical goods (such as for example, transplant organs).

The cooling system 100 comprises a main cooling unit 102. In some embodiments of the present technology, the main cooling unit 102 can be implemented as a conventional air conditioning unit and the like. The main cooling unit 102 comprises a main chilling unit 104. The main chilling unit 104 is configured to chill a cooling fluid, which cooling fluid is used within the main cooling unit 102. In some embodiments of the present technology, the cooling fluid used in the main cooling unit 102 is implemented as Chlorofluorocarbon (CFC) refrigerant, Hydrochlorofluorocarbon (HCFC) refrigerant, or Hydrofluorocarbon (HFC) refrigerant, also known as FREON—a trade-mark of DuPont with headquarters in Wilmington, Del., United States of America The main chilling unit 104 is in fluid communication with a heat exchanger 106 via a cooling fluid line 108. The main chilling unit 104 is configured to chill a cooling fluid, to supply the chilled cooling fluid to the heat exchanger 106 and to receive the warmed up cooling fluid from the heat exchanger 106 (the warmed up cooling fluid having been warmed up with by contact with a heat exchanger or another type of a heat source).

There is also provided a pump 110. The pump 110 is configured to propel the cooling fluid through the cooling fluid line 108. Both the main chilling unit 104 and the pump 110 are coupled (directly or indirectly) to a source of power 112, which can be a standard power grid connection. It should be noted that the main cooling unit 102 (i.e. the main chilling unit 104, the heat exchanger 106 and the pump 110) can be implemented as substantially known in the art.

There is also provided a back-up source of power 180, the back-up source of power 180 being implemented as substantially known in the art. For example, the back-up source of power 180 of the type described in the US patent application US 2007/0132317 can be used. Within embodiments of the present technology, the pump 110 is also connected to the back-up source of power 180. In some embodiments, the main cooling unit 102 can be also additionally coupled to the back-up source of power 180.

In accordance with non-limiting embodiments of the present technology, the cooling system 100 further comprises a back-up cooling unit 116. The back-up cooling unit 116 comprises a cooling reservoir 118. The cooling reservoir 118 is configured to house, in use, a plurality of small-sized self-contained cooling accumulators 120.

In one non-limiting embodiment of the present technology, the plurality of small-sized self-contained cooling accumulators 120 is implemented as containers housing a phase-change material. An example of such containers is provided by Cryogel of San Diego, Calif., United States of America. Another example of such containers is provided by Phase Change Material Products Limited of Yaxley, Cambridgeshire, United Kingdom of Great Britain and Northern Ireland.

Now, it should be expressly understood that the shape or the exact size of each one within the plurality of small-sized self-contained cooling accumulators 120 is not particularly limited. For example, in some embodiments of the present technology, each of the plurality of small-sized self-contained cooling accumulators 120 is implemented as ball-shaped container (as depicted in FIG. 1). Within these specific non-limiting embodiments, each of the plurality of small-sized self-contained cooling accumulators 120 can be implemented as a ball having a diameter of approximately 10 cm. The plurality of small-sized self-contained cooling accumulators 120 can, as an example, be filled with fluid, the fluid being a mixture of a salt and water.

In other non-limiting embodiments of the present technology, each of the plurality of small-sized self-contained cooling accumulators 120 is implemented as longitudinal sticks or square-like boxes. It should be noted that not all of the plurality of the small-sized self-contained cooling accumulators 120 need to implemented identical to each other. In other words, some of the small-sized self-contained cooling accumulators 120 may be implemented in a different form factor from other ones of the plurality of the small-sized self-contained cooling accumulators 120.

In some embodiments of the present technology, the plurality of small-sized self-contained cooling accumulators 120 is filled with a solution of a salt (or salts) and water. The solution can be selected such that to have a phase change temperature below zero degrees Celsius. In other embodiments, the plurality of small-sized self-contained cooling accumulators 120 can be filled with salt hydrates, which can have the change phase temperature of above zero degrees Celsius.

Finally, the plurality of small-sized self-contained cooling accumulators 120 can house organic materials, such as polymers with long chain molecules composed primarily of carbon and hydrogen. These materials tend to exhibit high orders of crystallinity when freezing and mostly change phase above zero degrees Celsius. Examples of organic materials used as phase change materials include (but are not limited to) waxes, oils, fatty acids and polyglycol s.

It should be expressly noted that the shape and the size, as well as the material used within, the plurality of small-sized self-contained cooling accumulators 120 can be selected by the operator of the cooling system 100 based on the specific cooling needs, the size of the dwelling to be cooled, the back-up cooling time required and the like.

Within the back-up cooling unit 116, there is also provided a secondary chilling unit 122. The secondary chilling unit 122 can be implemented similarly to the main chilling unit 104. To that extent, the secondary chilling unit 122 can also be coupled to the source of power 112. In an alternative non-limiting embodiment of the present technology, the secondary chilling unit 122 can be also coupled to the back-up source of power 180 in addition to the source of power 112.

In some embodiments of the present technology, the secondary chilling unit 122 can also use FREON as the cooling fluid. In alternative embodiments, the secondary chilling unit 122 can use $CO_2$. In some embodiments of the present technology, the use of $CO_2$ as the cooling fluid can make implementations of the secondary chilling unit 122 more environmentally friendly.

In yet additional non-limiting embodiments of the present technology, the secondary chilling unit 122 can be implemented as the main chilling unit 104. In other words, within those non-limiting alternative embodiments, the main chilling unit 104 can also serve the purpose of the secondary chilling unit 122. In those embodiments, description of operation of the secondary chilling unit 122 can apply mutatis mutandis to the embodiments where the main chilling unit 104 is used in lieu of the secondary chilling unit 122.

The back-up cooling unit 116 further includes a first valve 124. The first valve 124 can be implemented as a standard switch valve. Alternatively, the first valve 124 can be implemented as a proportional valve. In some embodiments of the present technology, the first valve 124 is coupled to the source of power 112. In alternative non-limiting embodiments, additionally the valve 124 can be also coupled to the back-up source of power 180. Alternatively, the first valve 124 can be under a control of a control entity (not depicted), the control entity being coupled to the source of power 112 and/or the back-up source of power 180. The first valve 124 can comprise three ports: a first valve port 124a, a second valve port 124b and a third valve port 124c.

The back-up cooling unit 116 further includes a second valve 126. The second valve 126 can be implemented as standard switch valve. Alternatively, the second valve 126 can be implemented as a proportional valve. In some embodiments of the present technology, the second valve 126 is coupled to the source of power 112. In alternative non-limiting embodiments, additionally the second valve 126 can also be coupled to the back-up source of power 180. Alternatively, the second valve 126 can be under a control of the control entity (not depicted), the control entity being coupled to the source of power 112 and/or the back-up source of power 180. The second valve 126 can comprise three ports: a first valve port 126a, a second valve port 126b and a third valve port 126c.

The first valve 124 and the second valve 126 can perform switching of various cooling lines. Within the back-up cooling unit 116, there are provided: (i) a first cooling line 140 fluidly coupling a cooling fluid intake (not separately numbered) of the cooling reservoir 118 and the first port 124a of the first valve 124; (ii) a second cooling like 142 fluidly coupling the third port 124c of the first valve 124 and the cooling line 108; (iii) a third cooling line 144 fluidly coupling a cooling fluid outlet of the cooling reservoir 118 and the first port 126a of the second valve 126; (iv) a fourth cooling line 146 fluidly coupling the third port 126c of the second valve 126 and the cooling line 108; and (v) a fifth cooling line 148 fluidly coupling the second port 124b of the first valve 124 and the second port 126b of the second valve 126.

As such, the first valve 124 and the second valve 126 can selectively fluidly couple (i) the first cooling line 140, the fifth cooling line 148 and the third cooling line 144 or (ii) the first cooling line 140 and the second cooling line 142, as well as the third cooling line 144 and the fourth cooling line 146. Within the configuration (i) the first port 124a and the second port 124b of the first valve 124, as well as the first port 126a and the second port 126b of the second valve 126 are open, while the third port 124c of the first valve 124 and the third port 126c of the second valve 126 are closed.

Within the configuration (ii) the first port 124a and the third port 124c of the first valve 124, as well as the first port 126a and the third port 126c of the second valve 126 are open, while the second port 124b of the first valve 124 and the second port 126b of the second valve 126 are closed.

Effectively, in the configuration (i), the cooling line 108 is disconnected from the back-up cooling unit 116 and in the configuration (ii), the cooling line 108 is connected to the back-up cooling unit 116.

In some embodiments of the present technology, the fluid resistance within the second cooling line 142 and the fourth cooling line 146 is higher than the fluid resistance within the cooling line 108 of the main cooling unit.

Even though not depicted in FIG. 1, the cooling reservoir 118 comprises internal piping for directing a flow of cooling fluid around the plurality of small-sized self-contained cooling accumulators 120. The shape and layout of this internal piping (not depicted) is not limited and will depend on numerous factors, as will be appreciated by those of skill in the art.

The back-up cooling unit 116 is configured to execute two modes of operations—a charging phase and a release phase. In the charging phase, the first valve 124 and the second valve 126 are actuated to fluidly couple the first cooling line 140, the fifth cooling line 148 and the third cooling line 144. Within this configuration, the secondary chilling unit 122 supplies cooling fluid to the cooling reservoir 118, while the cooling reservoir 118 is disconnected from the cooling line 108 (or, in other words, is disconnected from the main cooling unit 102).

It is noted that in embodiments of the present technology, the cooling fluid so supplied to the cooling reservoir 118 is cooled to or below the temperature for the substance contained in the plurality of small-sized self-contained cooling accumulators 120 to freeze (i.e. to shift phase). Hence, it can be said that during the charging phase, the plurality of small-sized self-contained cooling accumulators 120 get "charged" with back-up cooling power. In some embodiments of the present technology, the charging phase can be executed during low-demand time for electric power. For example, the charging phase can be executed during low-demand time for electric power, as an example, the charging phase can be implemented at night.

In the release phase, the first valve 124 and the second valve 126 are actuated to fluidly couple the first cooling line 140 and the second cooling line 142, as well as the third cooling line 144 and the fourth cooling line 146. In some embodiments of the present technology, the release phase can be turned on automatically, in case of the power failure. This automatic switching can be executed by the aforementioned control entity (not depicted). In alternative embodiments, the release phase can be turned on by an operator, when needed (for example, during the power failure).

Within this configuration, the cooling fluid from the cooling line 108 enters the cooling reservoir 118 and gets in contact with plurality of small-sized self-contained cooling accumulators 120. Effectively, the plurality of small-sized self-contained cooling accumulators 120 are used to cool the cooling fluid in the cooling line 108 by acting as a heat sink for the thermal energy within the warmed (or used) cooling fluid.

Within some embodiments of the present technology, within the release phase the main chilling unit 104 is turned off. In some embodiments, the secondary chilling unit 122 is also turned off. In some embodiments, the main chilling unit 104 and the secondary chilling unit 122 are turned off by virtue of lack of power (for example, in those embodiments where one or both of them are not coupled to the back-up source of power 180). Recalling that both the main chilling unit 104 and the secondary chilling unit 122 may be coupled to back-up source of power 180, the main chilling unit 104 and the secondary chilling unit 122 can be either turned off or disconnected from the back-up source of power 180. As will be explained momentarily, this is done in the interest of conserving back-up energy.

Within these embodiments, during the release phase, the back-up power can be used to provide power to the pump 110, the fans (not depicted) within the main cooling unit 102 and a controller (not depicted) responsible for controlling the cooling system 100. Generally speaking, the back-up power can be used to power only those components of the cooling system 100 that are critical for maintaining cooling within the cooling system 100 until the main power is restored (or at least an emergency generator can be turned on). In sense, some embodiments of the present technology allow to separate back-up cooling energy (provided by the plurality of small-sized self-contained cooling accumulators 120) and the back-up power (provided by the back-up source of power 180) and to focus the energy from the back-up source of power 180 on only "cooling-critical" components of the cooling system 100.

A technical effect of embodiments of the present technology allows preserving a portion of the back-up power and, hence, allows for longer use of the back-up power. The preservation of the portion of the back-up power is done, at least partially, by concentrating the use of the back-up power on motivating only those devices within the cooling system 100 that are "must have" for propelling of cooling fluid (and, thus maintaining the cooling) while the main power is down. Alternatively or additionally, a technical affect of embodiments of the present technology may include ability to use a smaller back-up power source.

In some embodiments of the present technology, the back-up cooling unit 116 can be located in a freight container, such as those typically used for sea freight. Within those embodiments, the back-up cooling unit 116 can be mobile. Alternatively or additionally, the back-up cooling unit 116 can be implemented as stackable back-up cooling unit. In other words, depending on the needs, one or more of the back-up cooling units 116 can be used at in a given site of the cooling system 100.

In other words, the back-up cooling unit 116 can be implemented as a modular system. Within such modular implementations, the stacked ones of the back-up cooling unit 116 can be fluidly coupled in parallel or in sequence. Additionally or alternatively, depending on the cooling needs, some of the stacked back-up cooling units 116 can be used to cool a subset of the dwellings or equipment to be cooled, while the others of the stacked back-up cooling units 116 can be used to cool another subset of the dwellings or equipment to be cooled.

Figure 2:
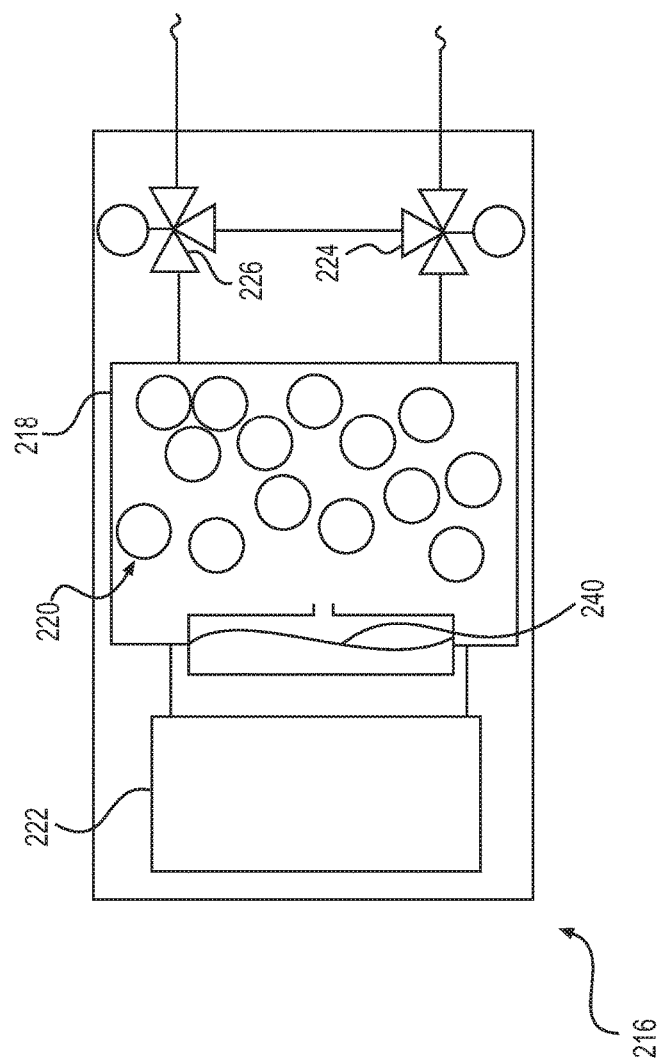
FIG. 2 depicts a schematic diagram of a back-up cooling unit 216, the back-up cooling unit 216 being implemented in accordance with another non-limiting embodiment of the present technology.

With reference to FIG. 2, there is depicted an alternative embodiment of a back-up cooling unit 216. The back-up cooling unit 216 can be executed substantially similar to the back-up cooling unit 116 of FIG. 1 and as such, the description to be presented herein below will focus primarily on the differences between implementations of FIG. 1 and FIG. 2.

Much akin to the back-up cooling unit 116, the back-up cooling unit 216 comprises a cooling reservoir 218. The cooling reservoir 218 is configured to house, in use, a plurality of small-sized self-contained cooling accumulators 220. Within the back-up cooling unit 216, there is also provided a secondary chilling unit 222. The back-up cooling unit 216 further includes a first valve 224 and a second valve 226.

Within the embodiments of FIG. 2, the cooling reservoir 218 is implemented with varying volume. Within these embodiments, there is provided a compensator 240, the compensator 240 being configured to compensate for the volume expansion or contraction within the cooling reservoir 218.

In a specific non-limiting implementation of the cooling system 100 or cooling system 200, the following parameters can be used. The power of the full energy release during the release phase is Qcol=400 kWh. The available cooling back-up from the secondary cooling unit 116, 216 is 0.5 hours. The time required to charge the plurality of small-sized self-contained cooling accumulators 220 is 12.5 hours. The power consumption during the charging phase is N=12 kWh. The cooling power of the main cooling unit 102 is q=32 kWh.

It should be expressly understood that the parameters presented above are used as an example only. Those skilled in the art, having read and appreciated teachings provided herein, will be able to modify the above parameters to suit their cooling and back-up needs. For example, should one desire to increase the cooling back-up time, one may increase the size of the cooling reservoir 118. Alternatively, one may choose to stack several ones of the back-up cooling unit 116.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A cooling system comprising:
a main cooling unit including a heat exchanger;
a main chiller in fluid communication, via a first fluid line, with the heat exchanger, the main chiller being configured to cool a cooling fluid for use with the heat exchanger; and
a back-up cooling unit including:
 a cooling reservoir including a plurality of self-contained cooling accumulators;
 a secondary chiller configured to cool the plurality of cooling accumulators, during a charging phase;
 a second fluid line in fluid communication with the first fluid line;
 a first three-way valve coupling the second fluid line to the cooling reservoir;
 a third fluid line in fluid communication with the first fluid line;
 a second three-way valve coupling the third fluid line to the cooling reservoir;
 a fourth fluid line fluidly connecting the first three-way valve to the second three-way valve, the first and second valves being configured to:
  form a first closed circuit within the back-up cooling unit during the charging phase by selectively allowing the cooling fluid to flow through the second fluid line, the third fluid line, and the fourth fluid line, flow of the cooling fluid from the first fluid line into the cooling reservoir being restricted during the charging phase, and
  form a second closed circuit extending between the back-up cooling unit and the main cooling unit by selectively allowing the cooling fluid to flow through the first fluid line, the second fluid line, and the third fluid line during a release phase, such that the plurality of cooling accumulators provide a heat sink to cool the cooling fluid for the main cooling unit,
 the cooling reservoir comprising a compensator configured to expand and contract a volume of the cooling reservoir.

2. The cooling system of claim 1, wherein the plurality of self-contained cooling accumulators house a phase change material.

3. The cooling system of claim 2, wherein the cooling fluid used in the secondary chiller is chilled to or below the phase change temperature of the phase change material.

4. The cooling system of claim 1, wherein the secondary chiller uses a cooling fluid and the cooling fluid is implemented as $CO_2$.

5. The cooling system of claim 1, further comprising a back-up source of power.

6. The cooling system of claim 1, wherein during said release phase, the main chiller is turned off.

7. The cooling system of claim 1, wherein during said release phase, the secondary chiller is turned off.

8. The cooling system of claim 1, wherein the secondary chiller and the main chiller are implemented as the same device.

9. A method of operating unit of claim 1, wherein the charging phase is implemented during off-peak demand time.

10. A back-up cooling unit for the use with a main cooling unit, the main cooling unit comprising a first fluid line comprising a cooling fluid, the back-up cooling unit comprising:
  a cooling reservoir including a plurality of self-contained cooling accumulators;
  a secondary chiller configured to cool the plurality of cooling accumulators, during a charging phase;
  a second fluid line in fluid communication with the first fluid line;
  a first three-way valve coupling the second fluid line to the cooling reservoir;
  a third fluid line in fluid communication with the first fluid line;
  a second three-way valve coupling the third fluid line to the cooling reservoir;
  a fourth fluid line fluidly connecting the first three-way valve to the second three-way valve, the first and second valves being configured to:
    form a first closed circuit within the back-up cooling unit during the charging phase by selectively allowing the cooling fluid to flow through the second fluid line, the third fluid line, and the fourth fluid line, flow of the cooling fluid from the first fluid line into the cooling reservoir being restricted during the charging phase, and
    form a second closed circuit extending between the back-up cooling unit and the main cooling unit by selectively allowing the cooling fluid to flow through the first fluid line, the second fluid line, and the third fluid line during a release phase, such that the plurality of cooling accumulators provide a heat sink to cool the cooling fluid for the main cooling unit,
  the cooling reservoir comprising a compensator configured to expand and contract a volume of the cooling reservoir.

11. The back-up cooling unit of claim 10, wherein the plurality of self-contained cooling accumulators house a phase change material.

12. The back-up cooling unit of claim 11, wherein the cooling fluid used in the secondary chiller is chilled to or below the phase change temperature of the phase change material.

13. The back-up cooling unit of claim 10, wherein the secondary chiller uses a cooling fluid and the cooling fluid is implemented as $CO_2$.

14. The back-up cooling unit of claim 10, wherein during said release phase, the main chiller is turned off.

15. The back-up cooling unit of claim 10, wherein during said release phase, the secondary chiller is turned off.

* * * * *